G. RETTIG,

Assignor to A. RETTIG & F. BENZINGER.

Coin-Wrapper.

No. 8,649. Reissued April 1, 1879.

*Attest:*
R. A. Dyer.
Clarence Poole

*Inventor:*
George Rettig.
by Geo. W. Dyer & Co.
Attys.

N. PETERS, PHOTO-LITHOGRAPHER, WASHINGTON, D. C.

UNITED STATES PATENT OFFICE.

GEORGE RETTIG, OF CHICAGO, ILLINOIS, ASSIGNOR TO ALBERT RETTIG AND FRIEDERICH BENZINGER.

IMPROVEMENT IN COIN-WRAPPERS.

Specification forming part of Letters Patent No. 190,903, dated May 15, 1877; Reissue No. 8,649, dated April 1, 1879; application filed December 31, 1878.

*To all whom it may concern:*

Be it known that I, GEORGE RETTIG, of Chicago, in the county of Cook and State of Illinois, have invented a new and useful Self-Counting Coin-Wrapper, of which the following is a full and accurate description, reference being had to the accompanying drawings, which make part of this specification, and in which—

Figure 1:
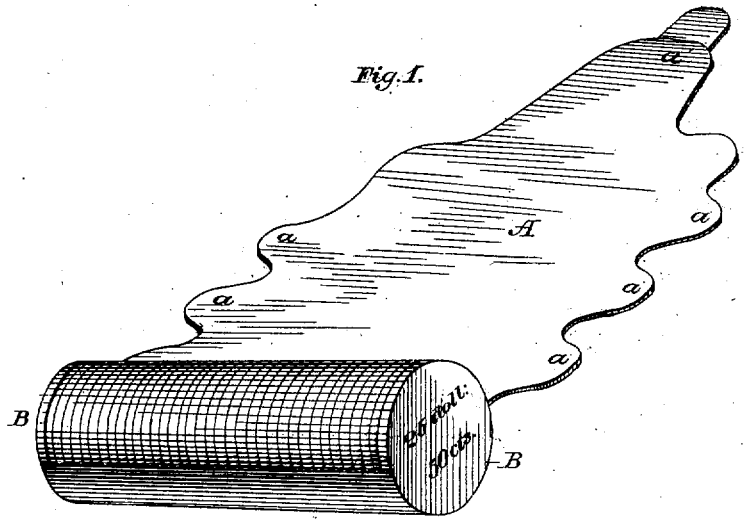
Figure 2:
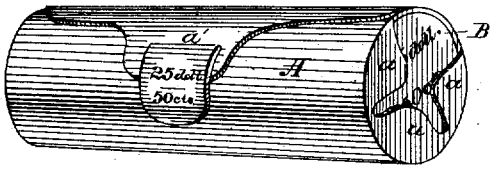
Figure 3:
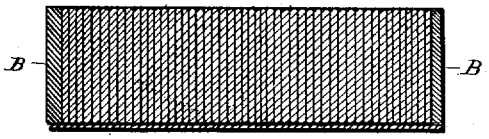

Figure 1 represents a perspective view of the wrapper partly filled with coin, and before closing the same. Fig. 2 represents the wrapper as it appears after being filled with coin and sealed, and Fig. 3 is a transverse section of the wrapper opened and filled with coin.

Similar letters of reference in the several figures indicate like parts.

This invention relates to wrappers for rolls of coin of equal denomination; and it has for its object to so construct and arrange such a wrapper that only a certain number of coin of that denomination for which it is intended will find space therein, thereby avoiding mistakes and saving the labor of counting.

The invention consists of a wrapper composed of a flap of suitable flexible material, to which are secured two washers or disks of stiff material at such an exact distance apart that the space between the same will correspond with the length of column composed of a desirable number of coins of equal size and denomination which are to be inclosed in such a coin-package, said disks or washers being of equal diameter with the coin, and the flap being secured upon or to the periphery of said disks about one-half of their circumference, so as to form a semi-cylindrical trough therewith, into which the coin is placed, and in which it is held by the remaining loose portion of the flap being turned over it, to be either permanently sealed by having gummed edges, so as to necessitate the partial destruction of the wrapper for removing the coin therefrom, or by locking it with a string or band of rubber, so that the coin is accessible to inspection without damage to the wrapper, all as substantially hereinafter described.

Referring to the accompanying drawings, A is a flap of paper, cloth, or other suitable flexible and tough material, or of pliable sheet metal having preferably scalloped and gummed edges *a a'*.

B B are two washers or disks, made of pasteboard or other suitable stiff material, the diameter of which is to correspond with the diameter of the denomination of coin for which the wrapper is intended. These two disks or washers B B are jointed to the flap A at such a distance apart from each other that the space between them will admit the requisite number of coin only. The end of the flap A is secured upon the edges of said washers or disks B to about one-half their circumference, so as to form a semi-cylindrical trough, into which the coin is placed, and in which it is locked by turning the remaining or loose portion of the flap over the roll and the scalloped edges, when such are preferred, upon the ends of the roll, where the gum first dampened will secure it, or by tying with a string or by placing a rubber band around it, in which latter case the contents of the package can be examined without damaging the wrapper.

The value and description of coin may be printed upon or embossed into the wrappers, or labels stating the contents may be pasted upon the same.

These wrappers can be made of various sizes for all kinds of coin, and of lengths to hold different values.

I am aware that a coin-wrapper has been made in which extensions of the flap were lapped upon each other, and united by a rivet for forming the ends; but these extensions could not be of a stiffer material than the flap of which they were a continuation, and which must be necessarily flexible, and therefore these ends would not be reliable as a gage for determining the number of coin to be contained in the package; nor could such a wrapper in that manner constructed be perfectly cylindrical without narrowing, and thereby weakening, the extensions for forming the end bearings for the coin to a limit which would endanger the security of the package.

Having thus described my invention, what I claim, and desire to secure by Letters Patent, is—

1. A coin-wrapper composed of the flap A, made of flexible material, and having secured thereto two disks, B, made of stiff material, and placed at such an exact distance apart corresponding with the space necessary for the desired number of coin of equal denomination to be contained in the package as to be a gage for the correct counting of said coin, substantially as set forth.

2. A coin-wrapper composed of two disks, B, made of stiff material, and of equal diameter with the denomination of coin for which said wrapper is intended, the said disks to be secured to a flap, A, of flexible material, at such exact distance apart as to admit the desired number of such coin only, all substantially in the manner and for the purpose described and shown.

3. The disks B, of stiff material and of equal diameter with the coin, and the flap A, of flexible material, secured upon the edges of said disks, so as to form a semi-cylindrical trough therewith for the reception of the coin, said flap having a loose end to be turned over the coin for closing the package, said disks being placed such exact distance apart as required for holding the desired number of coin of equal denomination to be contained in the package, so as to be a gage for the correct counting of the same, all of which to be constructed and arranged substantially in the manner and for the purpose set forth.

GEORGE RETTIG.

Witnesses:

ALBERT RETTIG,

WM. HAUSDING.